United States Patent [19]

Soji et al.

[11] Patent Number: 4,705,999

[45] Date of Patent: Nov. 10, 1987

[54] METHOD FOR CONTROLLING AN ARTICULATED ROBOT

[75] Inventors: Kazuo Soji, Hirakata; Hiroyuki Nagano, Moriguchi, both of Japan

[73] Assignee: Matsushita Electric Industrial Co., Ltd., Kadoma, Japan

[21] Appl. No.: 827,932

[22] PCT Filed: Apr. 25, 1985

[86] PCT No.: PCT/JP85/00234

§ 371 Date: Feb. 21, 1986

§ 102(e) Date: Feb. 21, 1986

[87] PCT Pub. No.: WO85/05198

PCT Pub. Date: Nov. 21, 1985

[30] Foreign Application Priority Data

Apr. 27, 1984 [JP] Japan .................................. 59-86420
May 7, 1984 [JP] Japan .................................. 59-90619

[51] Int. Cl.⁴ ............................................. G05B 19/42
[52] U.S. Cl. ..................................... 318/568; 364/513
[58] Field of Search ........................... 318/568, 568 M; 364/513

[56] References Cited

U.S. PATENT DOCUMENTS 4,534,006 8/1985 Minucciani ......................... 364/513

Primary Examiner—William M. Shoop, Jr.
Assistant Examiner—Saul M. Bergmann
Attorney, Agent, or Firm—Cushman, Darby & Cushman

[57] ABSTRACT

A method for controlling a first arm (11) and a second arm (12) in an articulated robot comprising said first arm (11) supported rotatably by a main body (1) via a first articulated joint and said second arm (12) supported rotatably by said first arm (11) via a second articulated joint.

When a top of said second arm (12) moves from a certain starting point $P_i$ to an end point $P_{i+1}$, the angular velocity curve during acceleration and deceleration is determined based on the positional data of the points $P_i$, $P_{i+1}$ in a manner such that the acceleration time and the deceleration time become shortest under such conditions that torques impressed on the motor (13), (14) and the speed reducer (15), (16) do not exceed an upper torque tolerance limit, respectively.

By such method, the transfer time can be shortened substantially and reasonably in comparison with the conventional method in which the acceleration and deceleration times are fixed.

4 Claims, 15 Drawing Figures

METHOD FOR CONTROLLING AN ARTICULATED ROBOT

BACKGROUND OF THE INVENTION

The present invention relates to a method for controlling a first arm and a second arm of an articulated robot having two pivotally connected arms.

Recently, by using a microprocessor, the control method for an industrial robot has changed to a digitized system to permit improved operating characteristics and velocity control of a robot arm based on a memorized cam curve whereby velocity instructions may be executed.

More specifically, the cam curve (S curve) having a relationship between time and a displacement amount, as shown in FIG. 1, is digitized and memorized as an S-table beforehand in a memory device and a desired displacement amount is derived one by one based on the cam curve at an operational time and a positional deviation against a present position and is supplied as a velocity instruction to a motor which drives each arm. In order to make the first arm and the second arm start simultaneously and to stop simultaneously, an instruction value derived from the S table is multiplied by a ratio of a displacement pulse amount for a first motor to a displacement pulse amount for a second motor, thereby producing an actual issued desired displacement amount.

As another method for supplying the velocity instruction to each motor, a hybrid control method is known that the cam curve having a relationship between the time and the velocity, as shown in FIGS. 2 and 3, is digitized and memorized in the memory device, and a velocity is derived one by one based on the cam curve at the operational time, and the control for the displacement amount is executed separately based on an integrated value of the issued velocity instruction, or another method using a cam curve having a relationship between the displacement amount and the velocity, as shown in FIGS. 4 and 5, is known.

Essentially, the articulated robot has characteristics such that the moment of inertia changes principally as a function of an angle of the second arm, and a centrifugal force or Coriolis force changes principally as a function of the angle of the second arm and the movement of the first arm and the second arm. Therefore, the load torque presented to a motor or a speed reducer changes largely as a function of the angle of the second arm and the movement of the first and second arms.

However, in the above-mentioned conventional methods, uniform acceleration and deceleration are executed without specifically considering the variation of the load and, therefore, the load torque under the severest conditions should not exceed a tolerance limit; that is, the uniform acceleration and deceleration are executed against an idle operation and the uniform acceleration and the uniform deceleration are substantial obstacles against a shortening of the time to effect a displacement from one point to another.

SUMMARY OF THE INVENTION

The first object of the present invention is to offer a method for controlling an articulated robot, which can control each arm in a manner such that the shortest transfer time is realized under such conditions that the capabilities of a motor and a driving circuit are best utilized and the torque load of the speed reducer does not exceed its tolerance limit.

Another object of the present invention is to offer a method for controlling an articulated robot, which can substantially shorten the transfer time for a displacement from one point to another in comparison with the conventional method which fixes the acceleration and deceleration time.

The above-mentioned object of the present invention is achieved by a method for controlling an articulated robot, wherein control is effected by supplying an angular velocity instruction to the respective motors of the first arm and the second arm, in an articulated robot comprising a first arm supported rotatablly by a main body via a first articulated joint, a second arm supported rotatablly by the first arm via a second articulated joint, a first motor and a second motor, or alternatively, a first motor and a first speed reducer and a second motor and a speed reducer, which are provided at the articulations and rotate the first arm and the second arm respectively, and by determining the angular velocity curve of the acceleration and the deceleration for a movement from an initial point $P_i$ to a successive point $P_{i+1}$ in a manner that the torques on the motor and the speed reducer do not exceed the torque tolerance limit and the shortest acceleration time and deceleration time can be obtained based on the positioning data of the initial and destination points $P_i$, $P_{i+1}$.

The present invention shortens the transfer time for the displacement from point $P_i$ to point $P_{i+1}$ by ① memorizing a reference acceleration curve and a reference deceleration curve in a memory beforehand;

② reading the positional data of the two points $P_i$ and $P_{i+1}$

③ obtaining an acceleration time or a displacement amount for the acceleration and a deceleration time or a displacement amount for the deceleration and the largest rotational number in a manner such that the load torque of the first motor, the second motor, the first speed reducer, and the second speed reducer does not exceed their respectively predetermined torques limits, and at least one of the motors or speed reducers is at its maximum allowable torque under its tolerance limit; and ④ expanding or contracting the reference acceleration curve and the reference deceleration curve according to the obtained acceleration time, displacement amount during acceleration, deceleration time displacement amount during, deceleration and the largest rotation number, thereby obtaining a reference acceleration curve and a reference deceleration curve which are implemented to control the acceleration and the deceleration to shorten the displacement time.

Further, the present invention includes such method that the reference acceleration curve and the reference deceleration curve, by which the velocity instruction values or the desired displacement position instruction values are obtained, are memorized in the memory device beforehand and factors, which affect the load torque of the motor are determined by the positional data of the displacement starting point and the displacement end point, are made respective discrete values and memorized in the memory device; and the acceleration time or the displacement amount during acceleration and the deceleration time or the displacement amount during deceleration are calculated beforehand for all combinations of the above-mentioned discrete value parameters in a manner the load torques of the first motor, the second motor, the first speed reducer and the second speed reducer do not exceed their respective respectively predetermined torque limits and at least one of the motors or reducers is at its maximum allowable torque, and they are memorized in the memory device responding to the above combinations of the above-mentioned discrete values parameters.

DESCRIPTION OF THE PREFERRED EMBODIMENT

Figure 1:
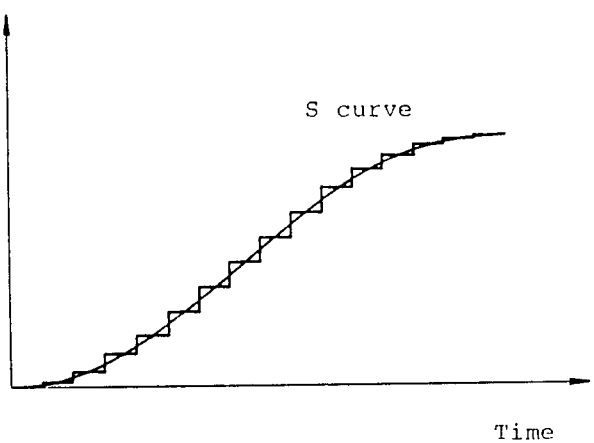
FIG. 1 is a cam curve diagram showing a relationship between time and a displacement amount.
Figure 2:
FIG. 2 is an acceleration cam curve showing a relation between time and velocity.
Figure 3:
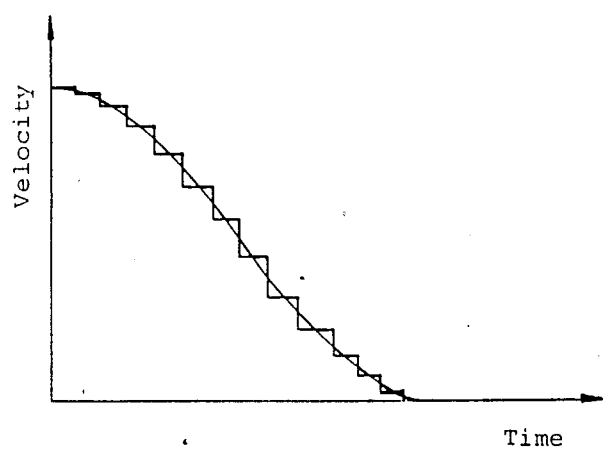
FIG. 3 is a deceleration cam curve showing the same relationship as that of FIG. 2.
Figure 4:
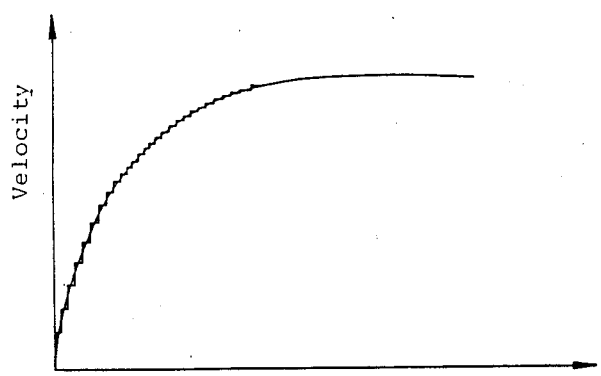
FIG. 4 is an acceleration cam curve showing a relation between a displacement amount and a velocity.
Figure 5:
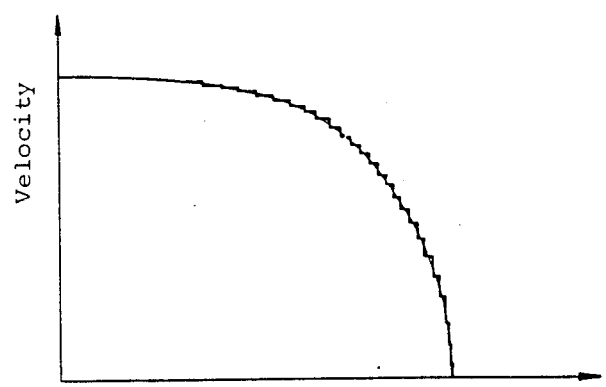
FIG. 5 is a deceleration cam curve of the same character as that of FIG. 4.
Figure 6:
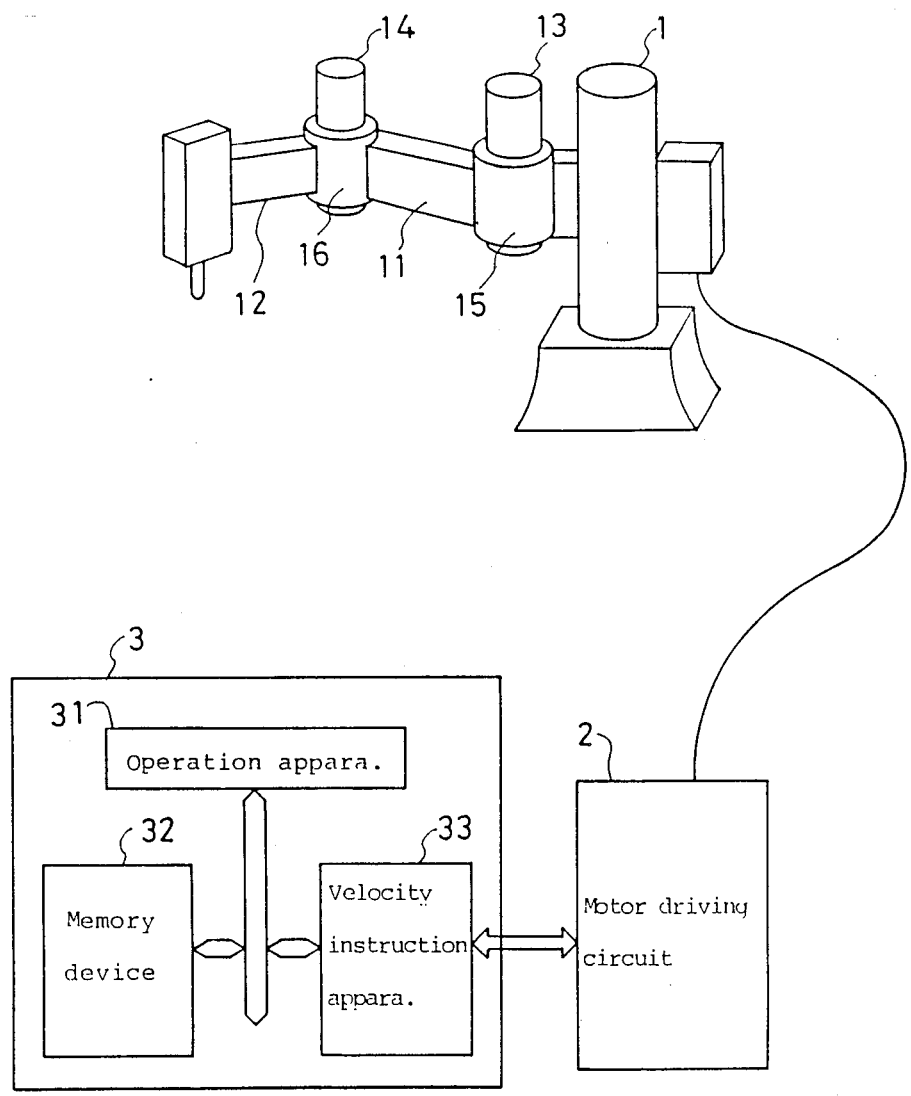
FIG. 6 is a diagram showing a system configuration for an articulated robot.

FIG. 6 is a diagram showing a system configuration for an articulated robot having two arms.

In the figure, numeral 1 is a supporter of a robot body, numeral 11 is the first arm connected rotatably to the supporter 1, numeral 12 is the second arm connected rotatably to the first arm 11, and numerals 13 and 14 are motors for driving the first arm 11 and the second arm 12. Numerals 15 and 16 are speed reducers to reduce the rotation of the motors 13 and 14 and transmit them to the first arm 11 and the second arm 12.

Numeral 2 is a driving circuit to drive the motors 13 and 14. Numeral 3 is a numerical control apparatus and comprises an operation apparatus 31, a memory device 32 and a velocity instruction apparatus 33 and produces a velocity instruction signal from data for determining a position stored in the memory device 32 and supplies the velocity instruction signal to the driving circuit 2 via the velocity instruction apparatus 33.

Next, a control method for the first embodiment of the present invention is described.

In the articulated robot, the torque impressed on the motor and the speed reducer differs principally as a function of the angle ($\theta_2$) between the first arm 11 and the second arm 12, the displacement velocities ($\theta_1$, $\theta_2$) of the first arm 11 and the second arm 12, and the rotation directions (positive and negative of $\Delta\theta_1$, $\Delta\theta_2$) of the first arm 11 and the second arm 12.

According to a dynamics principle, in the configuration of the present embodiment, a torque $T_1(t)$ impressed on the motor 13, a torque $T_2(t)$ impressed on the motor 14, a torque $H_1(t)$ impressed on the speed reducer 15 and a torque $H_2(t)$ impressed on the speed reducer 16 are, for example, expressed as $$T_1(t) = a_1\dot{\omega}_1 + a_2 H_1(T) + a_3\omega_1 + a_4|\omega_1/\omega_1| \tag{1}$$

$$T_2(t) = b_1\dot{\omega}_2 = b_2 H_2(t) + = b_3\omega_2 + b_4|\omega_2/\omega_2| \tag{2}$$

$$H_1(t) = (a_5 + a_6 \cos\theta_2)\dot{\omega}_1 + (a_7 + a_8 \cos\theta_2)\dot{\omega}_2 - (a_9\omega_1\omega_2 + a_{10}\omega_2)^2 \sin\theta_2 \tag{3}$$

$$H_2(t) = b_5\dot{\omega}_2 + (b_6 + b_7 \cos\theta_2)\dot{\omega}_1 + b_8\omega_1^2 \sin\theta_2 \tag{4},$$

wherein: $\omega_1$, $\omega_2$ are angular velocities of the motors 13, 14, respectively; $\dot{\omega}_1$, $\dot{\omega}_2$ are time differentiations of the angular velocities; $\theta_2$ is an angle made by the second arm 12 relative the first arm 11; $a_1$, $a_2$, ... $a_{10}$ and $b_1$, $b_2$, ..., $b_8$ are, respectively, constants peculiar of each robot, and are determined by an arm length, weight, speed reduction ratio, friction resistance and so on.

The object of the present invention is to control the largest torque impressed on the motor and the speed reducer. Generally, in the articulated robot, the acceleration time and the deceleration time are about 0.2–0.5 second and therefore in the equations (1)–(4), the values of $\dot{\omega}_1$, $\dot{\omega}_2$ are larger than that of $\omega_1$, $\omega_2$ and therefore generally the torque impressed on the motor and the speed reducer in the acceleration and deceleration is larger than that at $\dot{\omega}_1 = 0$, $\dot{\omega}_2 = 0$, that is, the displacement velocity becomes constant. Accordingly, hereinafter the description is limited to the torque control during acceleration and the deceleration.

Firstly, the torque control during acceleration is described when at least one of the first arm 11 and the second arm 12 reaches the largest rotation number.

Figure 7:
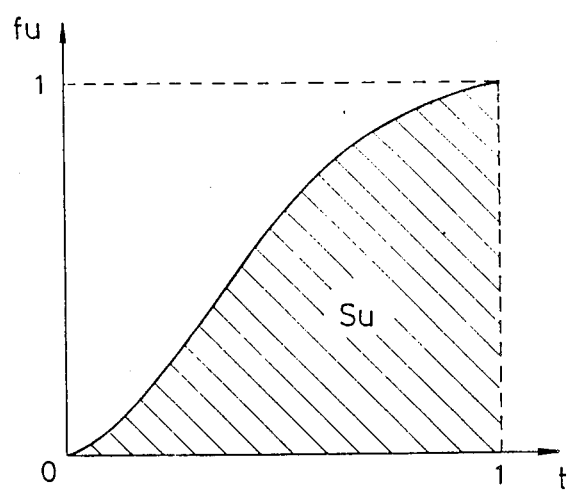
FIG. 7 is a diagram showing a reference acceleration curve used in the method of the present invention.

When, as an example of the reference acceleration curve, as shown in FIG. 7, such control is executed that the following relation holds:

$$\omega = f_u(t/t_u) \tag{5}$$

$$0 \leq t/t_u \leq 1$$

$$f_u(0) = 0, f_u(1) = 1$$

wherein $t_u$ is a time for the acceleration, and $\omega_1$ and $\omega_2$ are given as $$\omega_1 = C_1 f_u(t/t_u) \tag{6}$$

$$\omega_2 = C_2 f_u(t/t_u) \tag{7}$$

wherein $C_1$ and $C_2$ are given constants for respective steps;

then, by providing that the angle of the second arm 12 relative to the first arm 11 at the beginning of the acceleration is $\theta_{2s}$ and values when the $\omega_1$, $\omega_2$ become constant are $\bar{\omega}_1$, $\bar{\omega}_2$ respectively, the acceleration state of the first arm 11 and the second arm 12 is determined definitely by $\theta_{2s}$, $\bar{\omega}_1$, $\bar{\omega}_2$, $t_u$ since the $\omega_1$, $\omega_2$ are always in linear relation from the equations (6), (7);

and hence, by providing that peak values of $T_1(t)$, $T_2(t)$, $H_1(t)$, $H_2(t)$ are $T_{1p}$, $T_{2p}$, $H_{1p}$, $H_{2p}$ respectively, they are expressed by the following functions that:

$T_{1p} = g_1(\theta_{2s}, \overline{\omega}_1, \overline{\omega}_2, t_u)$  (8)

$T_{2p} = g_2(\theta_{2s}, \overline{\omega}_1, \overline{\omega}_2, t_u)$  (9)

$H_{1p} = g_3(\theta_{2s}, \overline{\omega}_1, \overline{\omega}_2, t_u)$  (10)

$H_{2p} = g_4(\theta_{2s}, \overline{\omega}_1, \overline{\omega}_2, t_u)$  (11).

Here, by providing that
$\Delta\theta_1$ is a displacement angle of the first arm 11,
$\Delta\theta_2$ is a displacement angle of the second arm 12,
$m_1$ is a reduction ratio of the speed reducer 15 $(m_1 > 0)$,
$m_2$ is a reduction of the speed reducer 16 $(m_2 > 0)$,
since the angular velocities $\omega_1$ and $\omega_2$ are always in a linear relation and the first arm 11 and the second arm 12 start simultaneously and stop simultaneously, $$\frac{\Delta\theta_2 m_2}{\Delta\theta_1 m_1} = \frac{\omega_2}{\omega_1} = \frac{\overline{\omega}_2}{\overline{\omega}_1} \quad (12)$$

holds. By providing that $\omega_{1M}$, $\omega_{2M}$ are the largest rotation velocities of the motors ($\omega_{1M} > 0$, $\omega_{2M} > 0$) and considering the rotation direction, (i) when $\Delta\theta_1 > 0$, $\left|\frac{\Delta\theta_2 m_2}{\Delta\theta_1 m_1}\right| \leq \frac{\omega_{2M}}{\omega_{1M}}$:

$\overline{\omega}_1 = \omega_{1M}$,  (13)

$\overline{\omega}_2 = \frac{\Delta\theta_2 m_2}{\Delta\theta_1 m_1} \omega_{1M}$,  (14)

(ii) when $\Delta\theta_1 < 0$, $\left|\frac{\Delta\theta_2 m_2}{\Delta\theta_1 m_1}\right| \leq \frac{\omega_{2M}}{\omega_{1M}}$:

$\overline{\omega}_1 = -\omega_{1M}$,  (15)

$\overline{\omega}_2 = -\frac{\Delta\theta_2 m_2}{\Delta\theta_1 m_1} \omega_{1M}$,  (16)

(iii) when $\Delta\theta_2 > 0$, $\left|\frac{\Delta\theta_2 m_2}{\Delta\theta_1 m_1}\right| > \frac{\omega_{2M}}{\omega_{1M}}$:

$\overline{\omega}_1 = \frac{\Delta\theta_1 m_1}{\Delta\theta_2 m_2} \omega_{2M}$,  (17)

$\overline{\omega}_2 = \omega_{2M}$,  (18)

(iv) when $\Delta\theta_2 < 0$, $\left|\frac{\Delta\theta_2 m_2}{\Delta\theta_1 m_1}\right| > \frac{\omega_{2M}}{\omega_{1M}}$:

$\overline{\omega}_1 = -\frac{\Delta\theta_1 m_1}{\Delta\theta_2 m_2} \omega_{2M}$,  (19)

$\overline{\omega}_2 = -\omega_{2M}$,  (20)

(v) when $\Delta\theta_1 = 0$, $\Delta\theta_2 > 0$:

$\overline{\omega}_1 = 0$,  (21)

$\overline{\omega}_2 = \omega_{2M}$,  (18)

(vi) when $\Delta\theta_1 = 0$, $\Delta\theta_2 < 0$:

$\overline{\omega}_1 = 0$,  (21)

$\overline{\omega}_2 = -\omega_{2M}$,  (20)

(vii) when $\Delta\theta_1 > 0$, $\Delta\theta_2 = 0$:

$\overline{\omega}_1 = \omega_{1M}$,  (13)

$\overline{\omega}_2 = 0$,  (22)

(viii) when $\Delta\theta_1 < 0$, $\Delta\theta_2 = 0$:

$\overline{\omega}_1 = -\omega_{1M}$,  (15)

$\overline{\omega}_2 = 0$,  (22)

hold.

Here, by providing that $$\alpha = \frac{\Delta\theta_2 m_2 \omega_{1M}}{\Delta\theta_1 m_1 \omega_{2M}}, \quad (23)$$

$$\beta = \frac{\Delta\theta_1 m_1 \omega_{2M}}{\Delta\theta_2 m_2 \omega_{1M}}, \quad (24)$$

when $\Delta\theta_1 = 0$ $\beta = 0$ and
when $\Delta\theta_2 = 0$ $\alpha = 0$ hold and therefore the above equations (13)–(22) are arranged as (i) when
$\Delta\theta_1 > 0$, $|\alpha| \leq 1$:

$\overline{\omega}_1 = \omega_{1M}$,  (25)

$\overline{\omega}_2 = \alpha\omega_{2M}$,  (26)

(ii) when
$\Delta\theta_1 < 0$, $|\alpha| \leq 11$:

$\overline{\omega}_1 = -\omega_{1M}$,  (27)

$\overline{\omega}_2 = -\alpha\omega_{2M}$,  (28)

(iii) when
$\Delta\theta_2 => 0$, $|\beta| < 1$:

$\overline{\omega}_1 = \beta\omega_{1M}$,  (29)

$\overline{\omega}_2 = \omega_{2M}$,  (30)

(iv) when
$\Delta\theta_2 < 0$, $|\beta| < 1$:

$\overline{\omega}_1 = -\beta\omega_{1M}$,  (31)

$\overline{\omega}_2 = -\omega_{2M}$.  (32)

Therefore, the equations (8)–(11) become as (i) when $|\alpha| \leq 1$:

$$T_{1p} = g_1\left(\theta_{2s}, \frac{\Delta\theta_1 \omega_{1M}}{|\Delta\theta_1|}, \frac{\Delta\theta_1 \alpha \omega_{2M}}{|\Delta\theta_1|}, t_u\right), \quad (33)$$

$$T_{2p} = g_2\left(\theta_{2s}, \frac{\Delta\theta_1 \omega_{1M}}{|\Delta\theta_1|}, \frac{\Delta\theta_1 \alpha \omega_{2M}}{|\Delta\theta_1|}, t_u\right), \quad (34)$$

-continued $$H_{1p} = g_3\left(\theta_{2s}, \frac{\Delta\theta_1\omega_{1M}}{|\Delta\theta_1|}, \frac{\Delta\theta_1\alpha\omega_{2M}}{|\Delta\theta_1|}, t_u\right), \quad (35)$$

$$H_{2p} = g_4\left(\theta_{2s}, \frac{\Delta\theta_1\omega_{1M}}{|\Delta\theta_1|}, \frac{\Delta\theta_1\alpha\omega_{2M}}{|\Delta\theta_1|}, t_u\right), \quad (36)$$

(ii) when $|\beta| < 1$:

$$T_{1p} = g_1\left(\theta_{2s}, \frac{\Delta\theta_2\beta\omega_{1M}}{|\Delta\theta_2|}, \frac{\Delta\theta_2\omega_{2M}}{|\Delta\theta_2|}, t_u\right), \quad (37)$$

$$T_{2p} = g_2\left(\theta_{2s}, \frac{\Delta\theta_2\beta\omega_{1M}}{|\Delta\theta_2|}, \frac{\Delta\theta_2\omega_{2M}}{|\Delta\theta_2|}, t_u\right), \quad (38)$$

$$H_{1p} = g_3\left(\theta_{2s}, \frac{\Delta\theta_2\beta\omega_{1M}}{|\Delta\theta_2|}, \frac{\Delta\theta_2\omega_{2M}}{|\Delta\theta_2|}, t_u\right), \quad (39)$$

$$H_{2p} = g_4\left(\theta_{2s}, \frac{\Delta\theta_2\beta\omega_{1M}}{|\Delta\theta_2|}, \frac{\Delta\theta_2\omega_{2M}}{|\Delta\theta_2|}, t_u\right). \quad (40)$$

Therefore, any $T_{1p}$, $T_{2p}$, $H_{1p}$, $H_{2p}$ are expressed by $\theta_{2s}$, $\alpha$, $\beta$, $\omega_{1M}$, $\omega_{2M}$, positive and negative of $\Delta\theta_1$, positive and negative of $\Delta\theta_2$ and $t_u$. Because $\omega_{1M}$ and $\omega_{2M}$ are constants and $\theta_{2s}$, $\alpha$, $\beta$, positive and negative of $\Delta\theta_1$ and positive and negative of $\Delta\theta_2$ are determined definitely by positional data of the initial point $P_i$ and the end point $P_{i+1}$ at a displacement step from point $P_i$ to the next point $P_{i+1}$, $t_u$ need be varied in order to vary the values of $T_{1p}$, $T_{2p}$, $H_{1p}$ and $H_{2p}$.

The object of the present invention is that $T_{1p}$, $T_{2p}$, $H_{1p}$, $H_{2p}$ not exceed the respective torque tolerance limits and further under such condition $t_u$ is made a minimum. Therefore, the optimum acceleration time $t_u$ can be obtained by using such method that the maximum values of the absolute values of $T_{1p}$, $T_{2p}$, $H_{1p}$ and $H_{2p}$ are obtained by varying the value of $t_u$ and those values do not exceed the torque tolerance limits determined respectively and further under such condition $t_u$ is converged to the smallest $t_u$.

Responding to the optimum acceleration time $\hat{t}_{ui}$ obtained for the step from point $P_i$ to point $P_{i+1}$, the optimum acceleration curve is obtained as $|\alpha| \leq 1$ (sic):

(i) when $|\alpha| \leq 1$:

$$\omega_{1i}(t) = \frac{\Delta\theta_1}{|\Delta\theta_1|} \omega_{1M} f_u\left(\frac{t}{\hat{t}_{ui}}\right),$$

$$\omega_{2i}(t) = \frac{\Delta\theta_1}{|\Delta\theta_1|} \alpha\omega_{2M} f_u\left(\frac{t}{\hat{t}_{ui}}\right),$$

(ii) when $|\beta| < 1$:

$$\omega_{1i}(t) = \frac{\Delta\theta_2}{|\Delta\theta_2|} \beta\omega_{1M} f_u\left(\frac{t}{\hat{t}_{ui}}\right),$$

$$\omega_{2i}(t) = \frac{\Delta\theta_2}{|\Delta\theta_2|} \omega_{2M} f_u\left(\frac{t}{\hat{t}_{ui}}\right).$$

Figure 8:
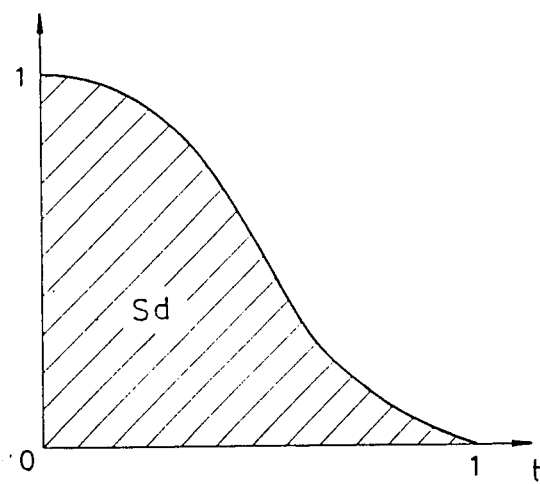
FIG. 8 is a diagram showing a deceleration curve.

Also, in the deceleration case, in a manner similar to the acceleration case, by using $\theta_{2E}$ of the second arm 12 relative to the first arm 11 at the point $P_{i+1}$ instead of $\theta_{2s}$, using the reference deceleration curve $fd(t/t_d)$ as shown in FIG. 8, wherein
  fd(0)=1 and
  fd(1)=0,
instead of the reference acceleration curve $fu(t/t_u)$, and using $t-t_s$ ($t_s$: deceleration starting time) instead of t, the optimum deceleration time $\hat{t}_{di}$ can be obtained.

Further, the optimum deceleration curve can be obtained likewise as (i) when $|\alpha| \leq 1$:

$$\omega_{1i}(t) = \frac{\Delta\theta_1}{|\Delta\theta_1|} \omega_{1M} f_d\left(\frac{t-t_s}{\hat{t}_{di}}\right),$$

$$\omega_{2i}(t) = \frac{\Delta\theta_1}{|\Delta\theta_1|} \alpha\omega_{2M} f_d\left(\frac{t-t_s}{\hat{t}_{di}}\right),$$

(ii) when $|\beta| < 1$:

$$\omega_{1i}(t) = \frac{\Delta\theta_2}{|\Delta\theta_2|} \beta\omega_{1M} f_d\left(\frac{t-t_s}{\hat{t}_{di}}\right),$$

$$\omega_{2i}(t) = \frac{\Delta\theta_2}{|\Delta\theta_2|} \omega_{2M} f_d\left(\frac{t-t_s}{\hat{t}_{di}}\right).$$

The angular velocity data so obtained are supplied to the velocity instruction circuit 33 and are issued as a velocity signal to the driving circuit 2. Further, the driving circuit 2 amplifies the signal and the motor 13 and the motor 14 are driven accordingly.

Next, a case, wherein $\Delta\theta_1$ and $\Delta\theta_2$ are small and $\omega_1$ and the $\omega_2$ do not mount up to the $\overline{\omega}_1$ and $\overline{\omega}_2$, is elucidated. At the time the arm is acceleratged from point A along the acceleration curve (FIG. 9):

$$\omega_1 = C_1 f_u(t/t_u), \quad \omega_2 = C_2 f_u(t/t_u),$$

and is made to a constant velocity from points B and B', and now is decelerated from points C and C' along the deceleration curve:

$$\omega_1 = D_1 f_d(t/t_d), \quad \omega_2 = D_2 f_d(t/t_d)$$

and stops at point D.

The problem is that the intervals of B-E, B'-E' of the acceleration curve and the intervals of F-C, F'-C' of the deceleration curve are not used in the actual operation and the parameters $t_u$, $t_d$ are not used in the determining the acceleration and the deceleration.

However, in the embodiment, the processing can be made by the same algorithm as that described previously by the below-mentioned concept.

Figure 9:
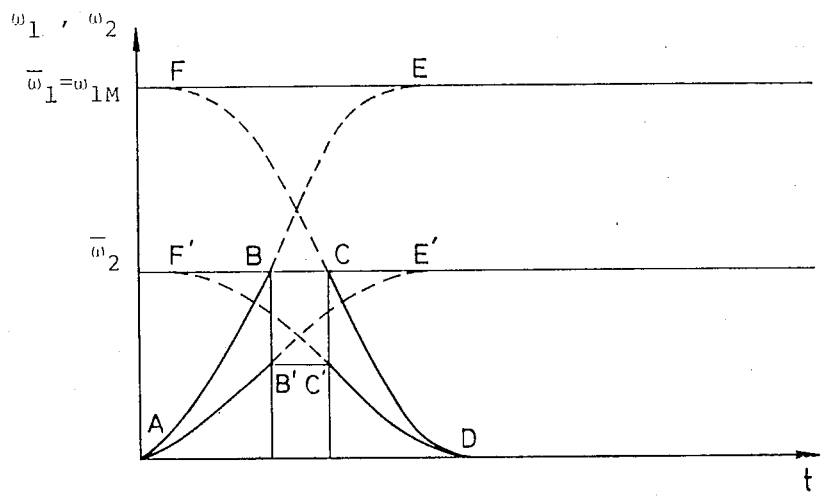
FIG. 9 is a diagram showing an angular velocity curve when none of the first motor and the second motor mounts up to the largest rotation number.
Figure 10:
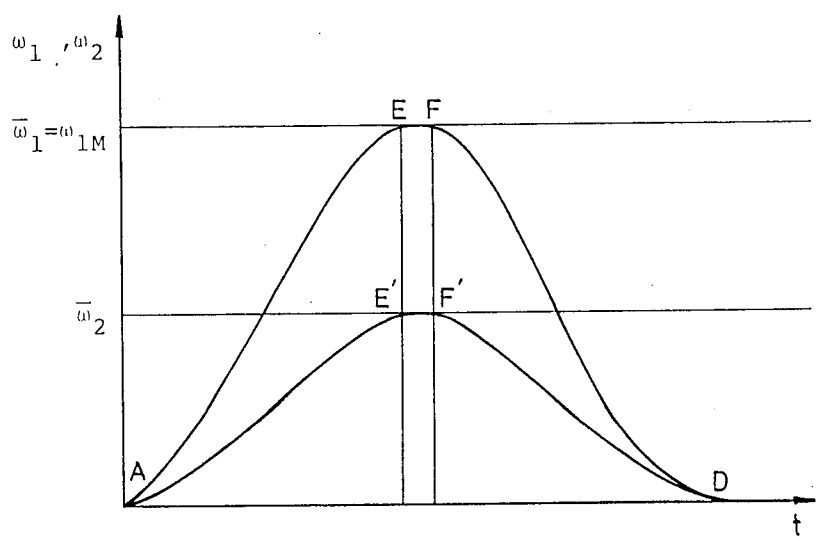
FIG. 10 is a diagram showing a supposed angular velocity curve used at a determination of the acceleration and the deceleration time of FIG. 9.

As shown in FIG. 9, such an operation is supposed that a part which reaches $\bar{\omega}_1$ and $\bar{\omega}_2$ appears by multiplying $\Delta\theta_1$, $\Delta\theta_2$ of FIG. 10 by certain constants. Then, $T_1(A-B) \subset T_1(A-E)$ $T_2(A-B') \subset T_2(A-E')$ $H_1(A-B) \subset H_1(A-E)$ $H_2(A-B') \subset H_2(A-E')$ $T_1(C-D) \subset T_1(F-D)$ $T_2(C'-D) \subset T_2(F'-D)$ $H_1(C-D) \subset H_1(F-D)$ $H_2(C'-D) \subset H_2(F'-D)$ hold, and therefore always the following hold:

$|T_{1p}(A-B)| \leq |T_{1p}(A-E)|$ $|T_{2p}(A-B')| \leq |T_{2p}(A-E')|$ $|H_{1p}(A-B)| \leq |H_{1p}(A-E)|$ $|H_{2p}(A-B')| \leq |H_{2p}(A-E')|$ $|T_{1p}(C-D)| \leq |T_{1p}(F-D)|$ $|T_{2p}(C'-D)| \leq |T_{2p}(F'-D)|$ $|H_{1p}(C-D)| \leq |H_{1p}(F-D)|$ $|H_{2p}(C'-D)| \leq |H_{2p}(F'-D)|$.

Accordingly, even though $t_u$ and $t_d$ are obtained by replacing the operation of FIG. 10 with the operation of FIG. 9, overload is not produced on the motor and for the speed reducer.

Further, in the embodiment, the terms $\bar{\omega}_1$ and $\bar{\omega}_2$ are not used to calculate the peak torque and $\alpha$, $\beta$, $\omega_{1M}$, $\omega_{2M}$, positive and negative of $\Delta\theta_1$ and positive and negative of $\Delta\theta_2$ are used, and $\alpha$ and $\beta$ are determined by the ratio of $\Delta\theta_1$ and $\Delta\theta_2$ as shown by the equations (23)-(24) and are not affected by the magnitudes of the terms $\Delta\theta_1$ and $\Delta\theta_2$. Accordingly, to process the operation shown in FIG. 9 with the previously mentioned algorithm executes automatically the replacement of the processing of the operation shown in FIG. 10, and therefore a particular treatment is not necessary against the operation shown in FIG. 9 and the same algorithm can be used to effect processing.

Figure 11:
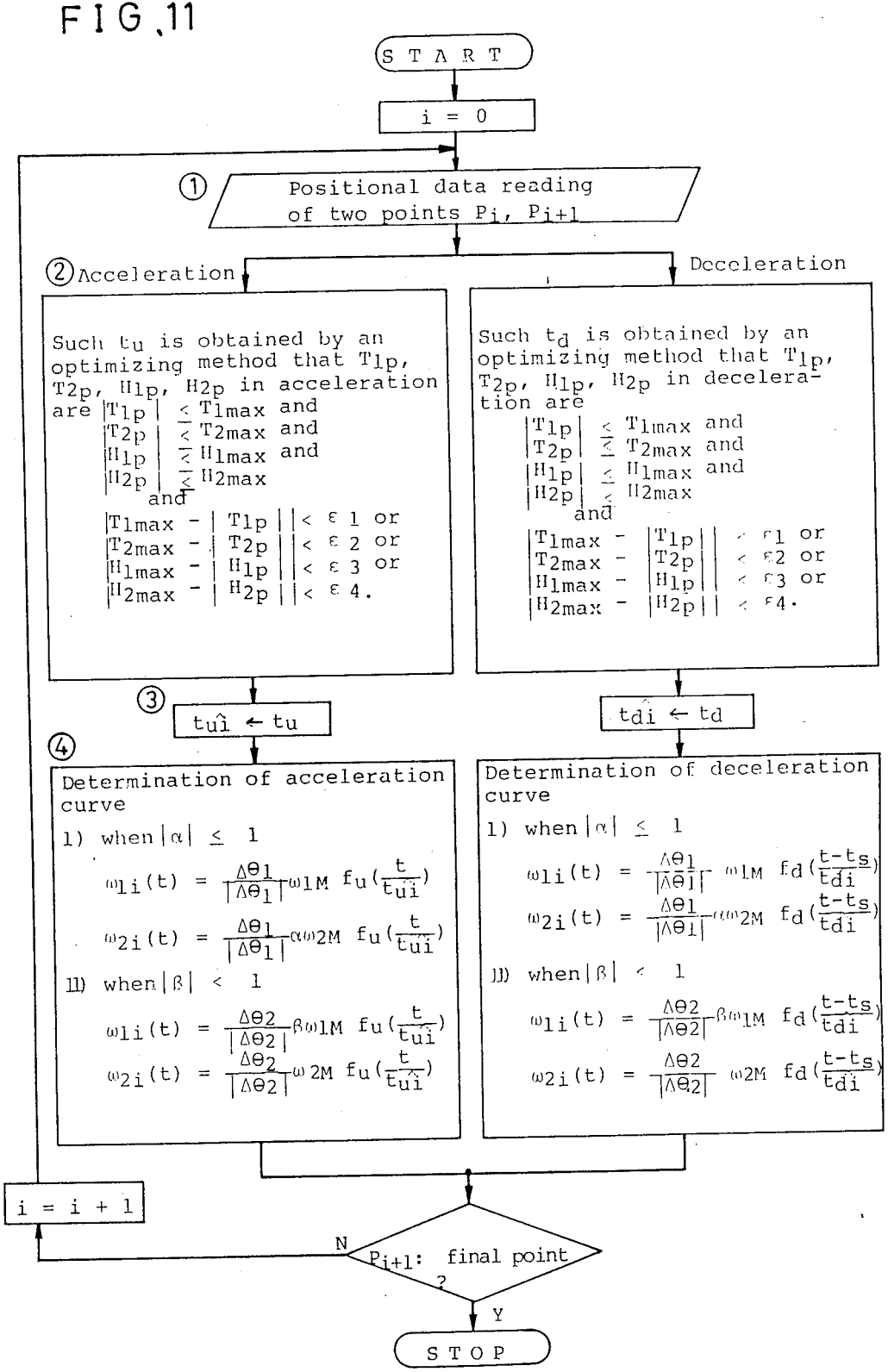
FIG. 11 is a flow chart of a first embodiment of the present invention.

The above-mentioned algorithm is described by using the flow chart shown in FIG. 11.

① The data about the two points $P_i$ and $P_{i+1}$ are read in.

② Such $t_u$ is obtained which makes $T_{1p}$, $T_{2p}$, $H_{1p}$ and $H_{2p}$ in the acceleration from point $P_i$ to point $P_{i+1}$ to be:

$|T_{1p}| \leq T_{1max}$ and $|T_{2p}| \leq T_{2max}$ and $|H_{1p}| \leq H_{1max}$ and $|H_{2p}| \leq H_{2max}$ and further $|T_{1max} - |T_{1p}|| < \epsilon_1$ or $|T_{2max} - |T_{2p}|| < \epsilon_2$ or $|H_{1max} - |H_{1p}|| < \epsilon_3$ or $|H_{2max} - |H_{2p}|| < \epsilon_4$ by using an optimizing method. Here, $T_{1max}$, $T_{2max}$, $H_{1max}$, $H_{2max}$ are the tolerance load torques of the motor and the speed reducer and $\epsilon_1$, $\epsilon_2$, $\epsilon_3$, $\epsilon_4$ are substantially small number. Further, in the deceleration, the optimum deceleration time $t_d$ is obtained likewise.

③ The $t_u$ and $t_d$ obtained in the step ② are considered as $t_{ui}$ and $t_{di}$.

④ The acceleration curve is set as:

(i) when $|\alpha| \leq 1$:

$$\omega_1(t) = \frac{\Delta\theta_1}{|\Delta\theta_1|} \omega_{1M} f_u\left(\frac{t}{\hat{t}_{ui}}\right),$$

$$\omega_2(t) = \frac{\Delta\theta_1}{|\Delta\theta_1|} \alpha\omega_{2M} f_u\left(\frac{t}{\hat{t}_{ui}}\right),$$

(ii) when $|\beta| < 1$:

$$\omega_1(t) = \frac{\Delta\theta_2}{|\Delta\theta_2|} \beta\omega_{1M} f_u\left(\frac{t}{\hat{t}_{ui}}\right),$$

$$\omega_2(t) = \frac{\Delta\theta_2}{|\Delta\theta_2|} \omega_{2M} f_u\left(\frac{t}{\hat{t}_{ui}}\right), \text{ and}$$

the deceleration curve is set as:

(i) when $|\alpha| \leq 1$:

$$\omega_1(t) = \frac{\Delta\theta_1}{|\Delta\theta_1|} \omega_{1M} f_d\left(\frac{t - t_s}{\hat{t}_{di}}\right),$$

$$\omega_2(t) = \frac{\Delta\theta_1}{|\Delta\theta_1|} \alpha\omega_{2M} f_d\left(\frac{t - t_s}{\hat{t}_{di}}\right),$$

(ii) when $|\beta| < 1$:

$$\omega_1(t) = \frac{\Delta\theta_2}{|\Delta\theta_2|} \beta\omega_{1M} f_d\left(\frac{t - t_s}{\hat{t}_{di}}\right),$$

$$\omega_2(t) = \frac{\Delta\theta_2}{|\Delta\theta_2|} \omega_{2M} f_d\left(\frac{t - t_s}{\hat{t}_{di}}\right).$$

Hereinafter, the steps from the step ① to the step ④ are repeated until the point $P_{i+1}$ reaches a final point.

Figure 12:
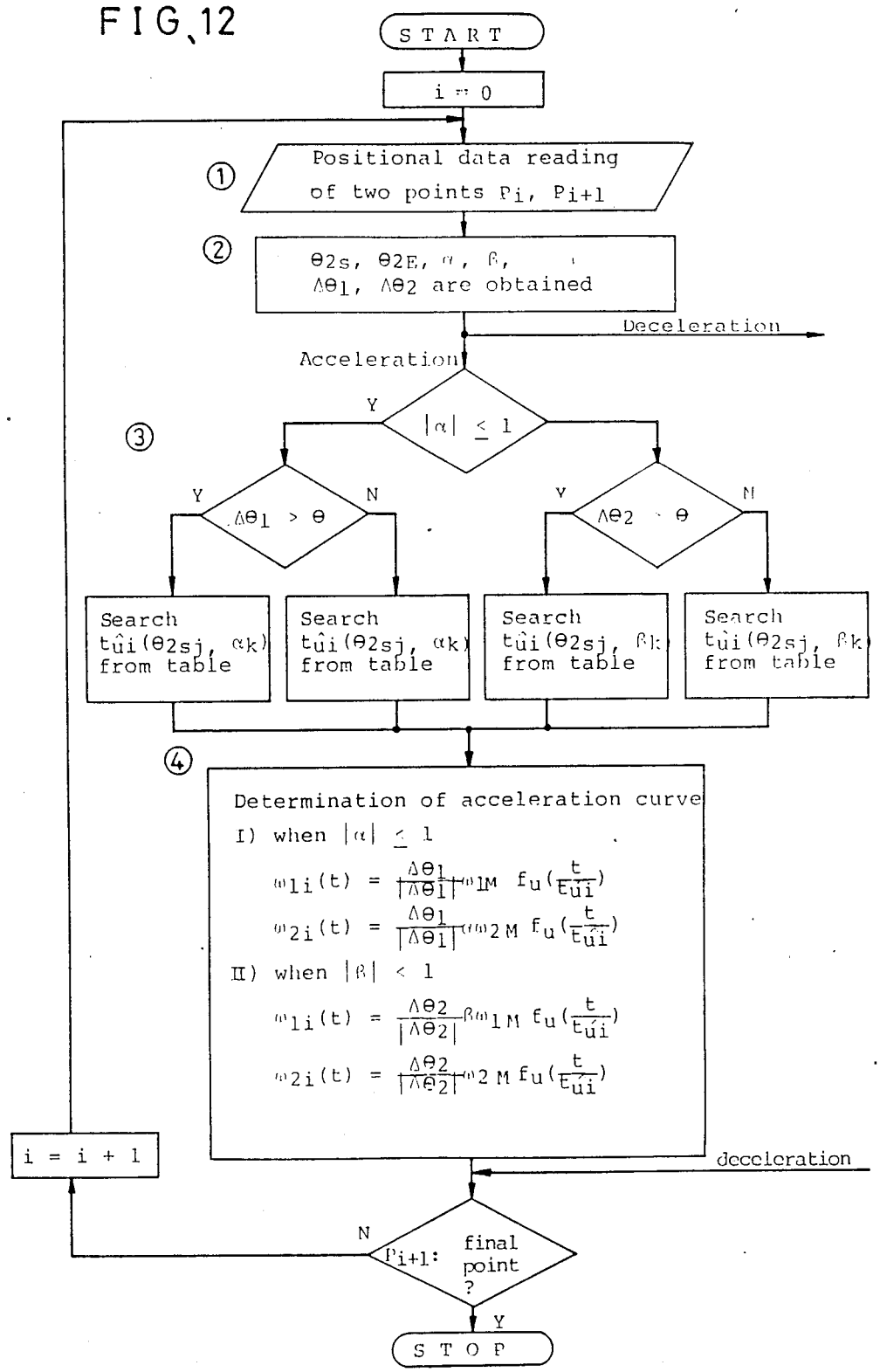
FIG. 12 is a flow chart of a second embodiment of the present invention.

Next, a second embodiment of the present invention is described based upon the flow chart of FIG. 12. The embodiment has such feature that in the step ② of the flow chart shown in FIG. 11, each parameter is made a discrete value parameter and the optimum acceleration time and the optimum deceleration for each parameter is calculated and memorized beforehand and the optimum acceleration time and the optimum deceleration time are obtained approximately by comparing the parameter obtained from the position data of point $P_i$ and point $P_{i+1}$ with the discrete value parameter, thereby simplifying the process substantially.

As described in the first embodiment, the following ones are the parameters for the optimum acceleration time and the optimum deceleration time:

$\theta_{2s}$: angle of the second arm 12 relative to the first arm 11 at the acceleration start $\theta_{2E}$: angle of the second arm 12 against the first arm 11 at the end of acceleration $$\alpha: \alpha = \frac{\Delta\theta_2 m_2 \omega_{1M}}{\Delta\theta_1 m_1 \omega_{2M}},$$

$$\beta: \beta = \frac{\Delta\theta_1 m_1 \omega_{2M}}{\Delta\theta_2 m_2 \omega_{1M}},$$

positive and negative of $\Delta\theta_1$ and
positive and negative of $\Delta\theta_2$, but the positive and negative of $\Delta\theta_1$ and the positive and the negative of $\Delta\theta_2$ have only two values respectively, and therefore it is obvious that to make the $\theta_{2s}$, $\theta_{2E}$, $\alpha$ and $\beta$ discrete value parameter is enough.

Hereinafter, the algorithm in the acceleration is described based on the flow chart in FIG. 12.

① The positional data of the two points $P_i$ and $P_{i+1}$ are read in.

② The parameters $\theta_{2s}$, $\theta_{2E}$, $\alpha$, $\beta$, $\Delta\theta_1$ and $\Delta\theta_2$ are obtained.

③ The acceleration time $t_u$ is searched in a table memorized beforehand by judging to which of four possible the pattern groups, the operation pattern of the robot belongs.

Here, the table is as when $|\alpha| \leq 1$, $\Delta\theta_1 > 0$: $\hat{t}_{ui}(\theta_{2sj}, \alpha_k)$, (i)

when $|\alpha| \leq 1$, $\Delta\theta_1 < 0$: $\hat{t}_{ui}(\theta_{2sj}, \alpha_k)$, (ii)

when $|\beta| < 1$, $\Delta\theta_2 > 0$: $\hat{t}_{ui}(\theta_{2sj}, \beta_k)$, (iii)

when $|\beta| < 1$, $\Delta\theta_2 < 0$: $\hat{t}_{ui}(\theta_{2sj}, \beta_k)$, (iv)

wherein
j=1, 2, 3, . . . , l,
k=1, 2, 3, . . . , l', $-\theta_{2max} \leq \theta_{2sj-1} < \theta_{2sj} \leq \theta_{2max}$, $-1 \leq \alpha_{k-1} < \alpha_k \leq 1$, $-1 \leq \beta_{k-1} < \beta_k \leq 1$, and $\theta_{2max}$ is a maximum angle of the second arm relative the first arm, and l and l' are natural number.

④ The acceleration curve is determined relative the obtained $\hat{t}_{ui}$ as:

(i) when $|\alpha| \leq 1$:

-continued $$\omega_{1i}(t) = \frac{\Delta\theta_1}{|\Delta\theta_1|} \omega_{1M} f_u\left(\frac{t}{\hat{t}_{ui}}\right),$$

$$\omega_{2i}(t) = \frac{\Delta\theta_1}{|\Delta\theta_1|} \alpha\omega_{2M} f_u\left(\frac{t}{\hat{t}_{ui}}\right),$$

(ii) when $|\beta| < 1$:

$$\omega_{1i}(t) = \frac{\Delta\theta_2}{|\Delta\theta_2|} \beta\omega_{1M} f_u\left(\frac{t}{\hat{t}_{ui}}\right),$$

$$\omega_{2i}(t) = \frac{\Delta\theta_2}{|\Delta\theta_2|} \omega_{2M} f_u\left(\frac{t}{\hat{t}_{ui}}\right).$$

During deceleration, the process is similar as the above-mentioned ③ and ④.

Hereinafter, the steps of ① to ④ are repeated until the point $P_{i+1}$ reaches the final point.

As mentioned above, in the embodiment, since the process for obtaining the acceleration and deceleration time, $\hat{t}_{ui}$ and $\hat{t}_{di}$ is simplified substantially, there are such feature that even a small operation processing apparatus can respond sufficiently.

Figure 13:
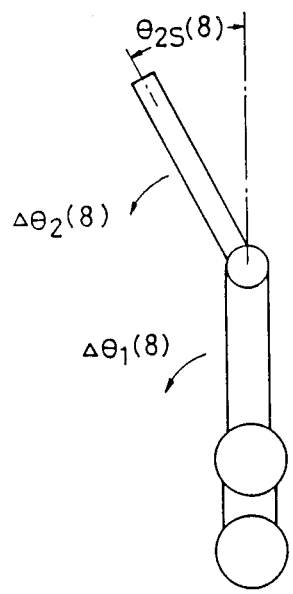
FIG. 13 and FIG. 14 are views describing an operation of the robot.
Figure 14:
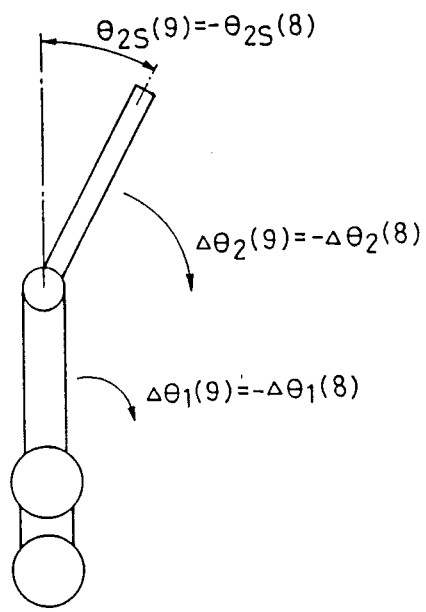
Figure 15:
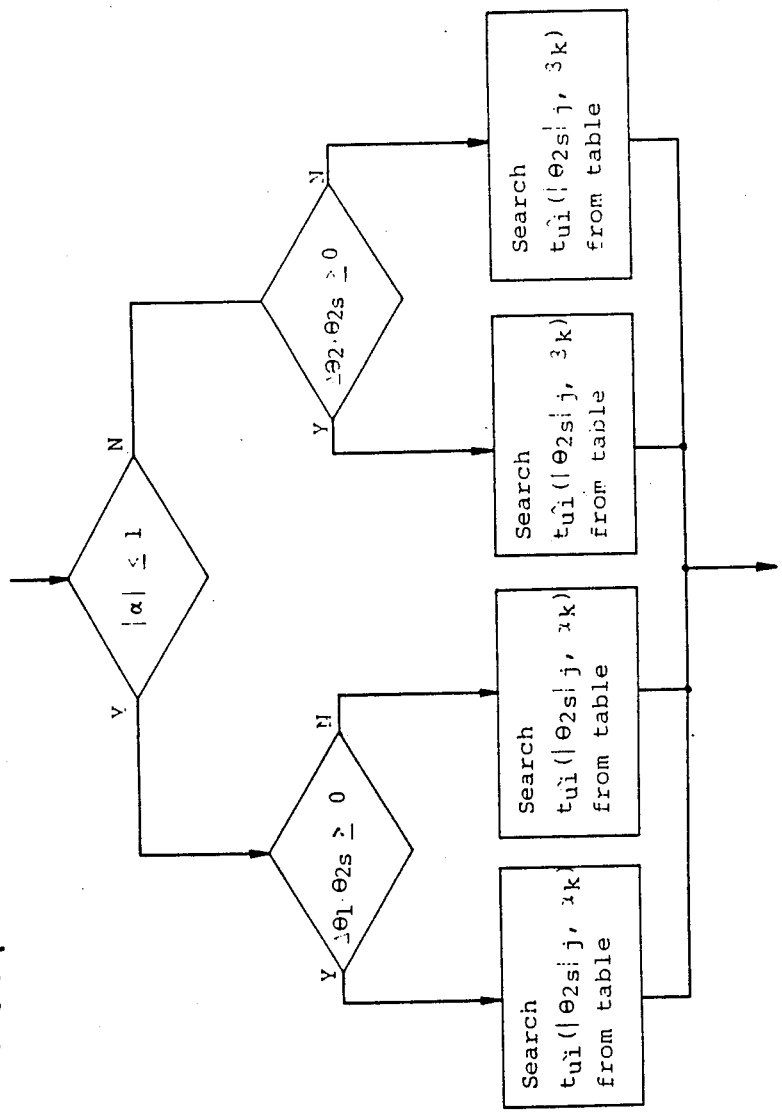
FIG. 15 is a partial flow chart of a third embodiment of the present invention.

Next, a third embodiment of the present invention is described basing on FIGS. 13–15.

In the above second embodiment, the symmetrical operations as shown in FIG. 13 and FIG. 14 are considered as different operations, and memory tables are prepared respectively. In the operations of FIG. 13 and FIG. 14, as apparent from the figure, $\Delta\theta_1(9) = -\Delta\theta_1(8)$ $\Delta\theta_2(9) = -\Delta\theta_2(8)$ $\theta_{2s}(9) = -\theta_{2s}(8)$ hold. Therefore, in the operation of FIG. 13 and FIG. 14, the load torques of the motor and the speed reducer are contrary for their positive and negative values, but the absolute values are equal. Since the object of the present invention is to obtain the acceleration and deceleration time under the case that the absolute value of the load torque is within the tolerance limit and, further, is optimum, by controlling of the peak torque, the above two operations may be considered to be the same operation and one memory table may be prepared for it; and by executing so the amount of the memory table can be compressed to half of that in the second embodiment.

Hereinafter, the part corresponding to the step ③ of FIG. 12 is shown in FIG. 15.

In the above-mentioned second embodiment, the positive and negative values of $\Delta\theta_1$ and $\Delta\theta_2$ are judged after the judgment of $|\alpha|$, but in the third embodiment, the positives and negatives of $\theta_1 \cdot \theta_{2s}$ and $\Delta\theta_2 \cdot \theta_{2s}$ are judged. The reason is that, by taking the case of FIG. 13 and FIG. 14, the following holds:

$\Delta\theta_1(9) \cdot \theta_{2s}(9) = (-\Delta\theta_1(8)) \cdot (-\theta_{2s}(8))$
$= \Delta\theta_1(8) \cdot \theta_{2s}(8).$ That is, by judging the positive and negative of $\Delta\theta_1 \cdot \Delta_{2s}$, these two operations can be treated as the same operation. Also, similar is as to $\Delta\theta_2 \cdot \theta_{2s}$.

It is necessary to use $|\theta_{2s}|_j$ instead of $\theta_{2sj}$ as the discrete value parameter of the memory table.

Thus, after arrangement, the following holds:

(i) when $$|\alpha| \leq 1, \Delta\theta_1 \cdot \theta_{2s} \geq 0:$$

$$\hat{t}_{ui}(|\theta_{2s}|_j, \alpha_k),$$

(ii) when $$|\alpha| \leq 1, \Delta\theta_1 \cdot \theta_{2s} < 0:$$

$$\hat{t}_{ui}(|\theta_{2s}|_j, \alpha_k),$$

(iii) when $$|\beta| < 1, \Delta\theta_2 \cdot \theta_{2s} \geq 0:$$

$$\hat{t}_{ui}(|\theta_{2s}|_j, \alpha_k),$$

(iv) when $$|\beta| < 1, \Delta\theta_2 \cdot \theta_{2s} < 0:$$

$$\hat{t}_{ui}(|\theta_{2s}|_j, \alpha_k),$$

$$j = 1, 2, 3, \ldots, l,$$
$$k = 1, 2, 3, \ldots, l,$$

$$0 \leq |\theta_{2s}|_{j-1} < |\theta_{2s}|_j \leq \theta_{2smax},$$

$$-1 \leq \alpha_{k-1} < \alpha_k \leq 1,$$

$$-1 \leq \beta_{k-1} < \beta_k \leq 1,$$

and that $\theta_{2smax}$ is a maximum angle of the second arm against the first arm, and l and l' are natural numbers.

Other processes, except for the above, can be processed in the same way as in the second embodiment.

As mentioned above, in the embodiment, the memory table can be made half of that of the second embodiment.

Incidentally, in the each above-mentioned embodiments, the reference acceleration curve and the reference deceleration curve are for producing the velocity instruction as a function of time but this way is but one example and other techniques may be used.

Further, in each of the above-mentioned embodiments, the load torque of the motor and the speed reducer is used as an optimizing condition; but this is one example and, for example, the optimization can be executed not considering the load torque of the speed reducer by using a speed reducer having a large torque tolerance limit. Conversely, the load torque of the other element may be taken into consideration. Further, in order to suppress the vibration, the factor made by differentiating the load torque as a function of time can be considered. In sum, it will do to intend to optimize, by contracting and/or extending the acceleration and deceleration time, the peak rotation number based on the reference acceleration and deceleration curve, as a result.

Further, in the second and third embodiment, $\theta_{2s}$, $\alpha$, $\beta$ and $\theta_{2E}$ are used as the discrete value parameters; but this is one example; and since the following relationships hold:

$$\alpha = \frac{\Delta\theta_2 \cdot m_2 \cdot \omega_{1M}}{\Delta\theta_1 \cdot m_1 \cdot \omega_{2M}}, \tag{23}$$

$$\beta = \frac{\Delta\theta_1 \cdot m_1 \cdot \omega_{2M}}{\Delta\theta_2 \cdot m_2 \cdot \omega_{1M}}, \tag{24}$$

$$\theta_{2E} = \theta_{2s} + \Delta\theta_2,$$

using of $\theta_{2s}$, $\alpha$, $\beta$ and $\theta_{2E}$ as the discrete value parameter and using $\theta_{2s}$, $\Delta\theta_1$ and $\Delta\theta_2$ as the discrete value parameter are entirely equivalent and the present invention is not different even though such parameters are used as the discrete parameter.

As mentioned above, the present invention is such that each operation, based on the supplied positional data for the beginning and end points of the displacement, the angular acceleration velocity is controlled in a manner that the torque impressed on the motor or on the motor and speed reducer during acceleration and deceleration attains a maximum value below the torque tolerance limit, and therefore the transfer time can be shortened substantially and reasonably, in comparison with the conventional case in which the acceleration and the deceleration time is fixed.

We claim:

1. A method for controlling an articulated robot of the type which comprises a first arm supported rotatably from a main body via a first articulated joint, a second arm supported rotatably from said first arm via a second articulated joint, and respective first and second motors coupled to said first and second articulated joints for rotating said first arm and said second arm, each of said first and second motors having a respective predetermined upper torque limit, wherein the displacement of said first arm and said second arm to displace the remote end of said second arm from an initial position $P_i$ to a subsequent position $P_{i+1}$ is controlled by angular velocity instructions provided to said first and second motors to effect controlled acceleration and deceleration during displacement from the initial position $P_i$ to the subsequent position $P_{i+1}$, said method comprising the steps of:

(a) storing a reference acceleration curve and a reference deceleration curve in a memory means by which velocity instruction values or desired displacement positional instruction values for said respective first and second motors are generated as a function of time or a displacement amount;

(b) reading in positional data for the initial position $P_i$ and the subsequent position $P_{i+1}$ to which the remote end of the second arm is to be displaced;

(c) varying an acceleration time or a displacement amount to obtain an acceleration value as a function of said stored reference curve information for acceleration of the remote end of said second arm from position $P_i$ to position $P_{i+1}$;

(d) calculating the torque load of said first motor and said second motor for acceleration of the remote end of said second arm from said initial position $P_i$ to said subsequent position $P_{i+1}$ for the obtained acceleration value;

(e) repeating said varying step (c) and calculating step (d) until the calculated torque load for each of said first and second motors is below its predetermined upper torque limit and the calculated torque load for at least one of said first and second motors if at a maximum value under its predetermined upper torque limit;

(f) varying a deceleration time or a displacement amount to obtain an deceleration value as a function of said stored reference curve information for deceleration of the remote end of said second arm from position $P_i$ to position $P_{i+1}$;

(g) calculating the torque load of said first motor and said second motor for deceleration of the remote end of said second arm from said initial position $P_i$ to said subsequent position $P_{i+1}$ for the obtained deceleration value;

(h) repeating said varying step (f) and calculating step (g) until the calculated torque load for each of said first and second motors is below its predetermined upper torque limit and the calculated torque load for at least one of said first and second motors is at a maximum value under its predetermined upper torque limit;

(i) using said obtained acceleration time or said displacement amount during acceleration as a reference for said stored reference acceleration curve and issuing a velocity instruction value or a desired displacement positional instruction for the acceleration portion of the displacement of the remote end of said second arm; and (j) using said obtained deceleration time or said displacement amount during deceleration as a reference for said stored reference deceleration curve and issuing a velocity instruction value or desired displacement positional instruction for the deceleration portion of the displacement of the remote end of said second arm.

2. A method for controlling an articulated robot of the type which comprises a first arm supported rotatably from a main body via a first articulated joint, a second arm supported rotatably from said first arm via a second articulated joint, and respective first and second motors coupled to said first and second articulated joints for rotating said first arm and said second arm, each of said first and second motors having a respective predetermined upper torque limit, wherein the displacement of said first arm and said second arm to displace the remote end of said second arm from an initial position $P_i$ to a subsequent position $P_{i+1}$ is controlled by angular velocity instructions provided to said first and second motors to effect controlled acceleration and deceleration during displacement from the initial position $P_i$ to the subsequent position $P_{i+1}$, said method comprising the steps of:

storing a reference acceleration curve and a reference deceleration curve in a memory device by which velocity instruction values or desired displacement positional instruction values are generated as a function of time or a displacement amount;

storing discrete values of factors which affect torque load of said first and second motors as a function of positional data for a displacement starting point and a displacement ending point;

calculating combination-values for all combinations of said discrete value parameters for acceleration times or the displacement amounts during acceleration, the deceleration times or the displacement amounts during deceleration which combination-values make said load torques of said first motor and said second motor below their respective predetermined upper torque limit and the torque load for at least one of said first and second motors at a maximum value under its predetermined upper torque limit;

memorizing the calculated combination-values in a memory device corresponding to said combinations of said discrete value parameters;

reading in positional data for an initial position $P_i$ and a subsequent position $P_{i+1}$;

calculating factors used for said discrete value parameters from positional data for the initial position $P_i$ and a subsequent position $P_{i+1}$;

comparing said factors calculated value with said stored discrete value parameters and obtaining the acceleration time or the displacement amount during acceleration and the deceleration time or the displacement amount during deceleration, which correspond to the nearest discrete value parameters;

using said acceleration time or said displacement amount during said acceleration obtained by said comparing step as a reference value for said reference acceleration curve and issuing velocity instruction values or a desired displacement positional instruction during acceleration; and using said deceleration time or said displacement amount during deceleration obtained by said comparing step as a reference for said reference deceleration curve and issuing velocity instructions value or a desired transfer positional instruction in the deceleration.

3. A method for controlling an articulated robot of the type which comprises a first arm supported rotatably from a main body via a first articulated joint, a second arm supported rotatably from said first arm via a second articulated joint, a first motor and a first speed reducer coupled to said first articulated joint and a second motor and second speed reducer connected to said second articulated joint for rotating said first arm and said second arm, said first motor and first speed reducer and said second motor and second speed reducer having respective predetermined upper torque limits, wherein the displacement of said first arm and said second arm to displace the remote end of said second arm from an initial position $P_i$ to a subsequent position $P_{i+1}$ is controlled by angular velocity instructions provided to said first and second motors to effect controlled acceleration and deceleration during displacement from the initial position $P_i$ to the subsequent position $P_{i+1}$, said method comprising the steps of:

(a) storing a reference acceleration curve and a reference deceleration curve in a memory means by which velocity instruction values or desired displacement positional instruction values for said respective first and second motors are generated as a function of time or a displacement amount;

(b) reading in positional data for the initial position $P_i$ and the subsequent position $P_{i+1}$ to which the remote end of the second arm is to be displaced;

(c) varying an acceleration time or a displacement amount to obtain an acceleration value as a function of said stored reference curve information for acceleration of the remote end of said second arm from position $P_i$ to position $P_{i+1}$;

(d) calculating the torque load of said first motor and said first speed reducer and said second motor and said second speed reducer for acceleration of the remote end of said second arm from said initial position $P_i$ to said subsequent position $P_{i+1}$ for the obtained acceleration value;

(e) repeating said varying step (c) and calculating step (d) until the calculated torque load for each of said first motor and first speed reducer and said second motor and second speed reducer is below their respective predetermined upper torque limit and the calculated torque load for at least one of said first motor and first speed reducer said second motor and second speed reducer is at a maximum value under its predetermined upper torque limit;

(f) varying a deceleration time or a displacement amount to obtain an deceleration value as a function of said stored reference curve information for deceleration of the remote end of said second arm from position $P_i$ to position $P_{i+1}$;

(g) calculating the torque load of said first motor and said first speed reducer and said second motor and speed reducer for deceleration of the remote end of said second arm from said initial position $P_i$ to said subsequent position $P_{i+1}$ for the obtained deceleration value;

(h) repeating said varying step (f) and calculating step (g) until the calculated torque load for each of said first motor and first speed reducer and said second motor and second speed reducer is below their respective predetermined upper torque limit and the calculated torque load for at least one of said first motor and speed reducer and said second motor and second speed reducer is at a maximum value under its predetermined upper torque limit;

(i) using said obtained acceleration time or said displacement amount during acceleration as a reference for said stored reference acceleration curve and issuing a velocity instruction value or a desired displacement positional instruction for the acceleration portion of the displacement of the remote end of said second arm; and (j) using said obtained deceleration time or said displacement amount during deceleration as a reference of said reference deceleration curve and issuing a velocity instruction value or desired displacement positional instruction for the deceleration portion of the displacement of the remote end of said second arm.

4. A method for controlling an articulated robot of the type which comprises a first arm supported rotatably from a main body via a first articulated joint, a second arm supported rotatably from said first arm via a second articulated joint, a first motor and a first speed reducer coupled to said first articulated joint and a second motor and second speed reducer connected to said second articulated joint for rotating said first arm and said second arm, said first motor and first speed reducer and said second motor and second speed reducer having respective predetermined upper torque limits, wherein the displacement of said first arm and said second arm to displace the remote end of said second arm from an initial position $P_i$ to a subsequent position $P_{i+1}$ is controlled by angular velocity instructions provided to said first and second motors to effect controlled acceleration and deceleration during displacement from the initial position $P_i$ to the subsequent position $P_{i+1}$, said method comprising the steps of:

storing a reference acceleration curve and a reference deceleration curve in a memory device by which velocity instruction values or desired displacement positional instruction values are generated as a function of time or a displacement amount;

storing discrete values of factors which affect torque load of said first motor and first speed reducer and said second motor second speed reducer as a function of positional data for a displacement starting point and a displacement ending point;

calculating combination-values for all combinations of said discrete value parameters for acceleration times or the displacement amounts during acceleration and the deceleration times or the displacement amounts during deceleration which combination-values make said load torques of said first motor and first speed reducer and said second motor and second speed reducer below their respective predetermined upper torque limit and the torque load for at least one of said first motor and first speed reducer and said second motor and second speed reducer at a maximum value under its respective predetermined upper torque limit;

memorizing the calculated combination-values in a memory device corresponding to said combinations of said discrete value parameters;

reading in positional data for an initial position $P_i$ and a subsequent position $P_{i+1}$;

calculating factors used for said discrete value parameters from positional data for the initial position $P_i$ and a subsequent position $P_{i+1}$;

comparing said factors calculated value with said stored discrete value parameters and obtaining the acceleration time or the displacement amount during acceleration and the deceleration time or the displacement amount during deceleration, which correspond to the nearest discrete value parameters;

using said acceleration time or said displacement amount during said acceleration obtained by said comparing step as a reference value for said reference acceleration curve and issuing velocity instruction values or a desired displacement positional instruction during acceleration; and using said deceleration time or said displacement amount during deceleration obtained by said comparing step as a reference for said reference deceleration curve and issuing velocity instructions value or a desired transfer positional instruction in the deceleration.

* * * * *